United States Patent [19]

Kloster

[11] 4,280,602
[45] Jul. 28, 1981

[54] STRUT SUSPENSION REPAIR STRUCTURE

[75] Inventor: Kenneth D. Kloster, Maumee, Ohio

[73] Assignee: Alvey, Inc., St. Louis, Mo.

[21] Appl. No.: 86,786

[22] Filed: Oct. 22, 1979

[51] Int. Cl.³ ............................................ F16F 9/54
[52] U.S. Cl. .............................. 188/322; 29/402.08;
        188/321; 285/177; 285/417; 403/375; 411/176
[58] Field of Search ............... 188/321, 322; 403/373,
         403/375, 344; 29/402.03, 402.04, 402.05,
     402.06, 402.07, 402.08, 434; 151/21 C, 21 R, 19
                      R, 41.72; 285/417, 369, 177, 420

[56] References Cited

U.S. PATENT DOCUMENTS

| | | | |
|---|---|---|---|
| 432,248 | 7/1890 | Rinman | 285/177 |
| 692,881 | 2/1902 | Lindsay | 285/369 X |
| 725,568 | 4/1903 | Johnston | 285/177 X |
| 1,799,783 | 4/1931 | Church | 285/177 X |
| 2,255,673 | 9/1941 | McDermott | 285/417 X |
| 2,943,711 | 7/1960 | Rossman | 188/322 |
| 4,143,729 | 3/1979 | West et al. | 188/321 X |

FOREIGN PATENT DOCUMENTS

| | | | |
|---|---|---|---|
| 6703785 | 9/1968 | Netherlands | 188/321 |
| 317290 | 8/1929 | United Kingdom | 411/291 |
| 987717 | 3/1965 | United Kingdom | 411/280 |

*Primary Examiner*—George E. A. Halvosa
*Attorney, Agent, or Firm*—Gravely, Lieder & Woodruff

[57] ABSTRACT

This invention relates to a threaded pinch-bolt sleeve which is utilized in conjunction with an associated retaining nut to hold a replacement shock absorber within the cylindrical housing of a vehicular suspension system of the type commonly referred to as a MacPherson strut suspension system. The sleeve includes a generally cylindrical main body portion which is placed over the upper portion of the cylindrical housing. A pinch bolt attached to the outer side wall of the main body portion is tightened to secure the sleeve to the cylinder. The upper end of the sleeve is provided with either internal or external threads to receive a retaining nut to hold the replacement shock absorber in the associated cylindrical housing.

3 Claims, 6 Drawing Figures

STRUT SUSPENSION REPAIR STRUCTURE

BACKGROUND OF THE INVENTION

One type of vehicle suspension system which is becoming increasingly popular is the MacPherson strut suspension system. The MacPherson strut is an integral coil spring—shock absorber assembly which provides a lightweight, compact vehicle suspension system. The MacPherson strut suspension system is disclosed in more detail in U.S. Pat. No. 2,624,592 to E. S. MacPherson.

One of the problems associated with MacPherson strut assemblies is that the shock absorber typically wears out before the associated coil spring. One solution to this problem is to manufacture the MacPherson strut assembly with a construction which permits the shock absorber to be readily removed and replaced with a new shock absorber. However, this type of construction results in additional manufacturing expense. Consequently, some manufacturers produce MacPherson strut assemblies which do not readily accept replacement shock absorbers. In this type of assembly, the original equipment shock absorber is inserted into an associated cylindrical housing which is subsequently sealed by welding or roll forming operations. The cylindrical housing typically includes a coil spring support and a lower support bracket. Thus, when the shock absorber wears out, the vehicle owner is faced with the expense of replacing the entire cylindrical housing assembly, including the coil spring support and the lower support bracket.

SUMMARY OF THE INVENTION

The present invention relates to a threaded pinch-bolt sleeve which is utilized in conjunction with an associated retaining means to hold a replacement shock absorber within the cylindrical housing of a MacPherson strut suspension system. If the original shock absorber has been sealed within the cylindrical housing, the upper end of the housing must be severed to provide access to the original shock absorber. After the upper end of the housing has been severed, the worn shock absorber is readily accessible and may be removed and replaced with a new shock absorber. The pinch-bolt sleeve can then be secured on the housing to receive the retaining means.

Accordingly, it is an object of the present invention to produce a device which permits a sealed cylindrical housing of a MacPherson strut assembly to retain a replacement shock absorber.

It is another object of the present invention to produce a device for holding a replacement shock absorber in the cylindrical housing of a MacPherson strut suspension system.

The above and other objects of the invention may be typically achieved by a device comprising a hollow main body including an inner annular wall of a predetermined diameter and a threaded portion formed adjacent one end of the main body. The device includes a clamp means for selectively varying the diameter of at least a portion of the inner wall of the main body.

BRIEF DESCRIPTION OF DRAWINGS

The above, as well as other objects and advantages of the invention will become readily apparent to one skilled in the art from reading the following detailed description of the invention when considered in the light of the accompanying drawings, in which.

DESCRIPTION OF THE PREFERRED EMBODIMENT

Figure 1:
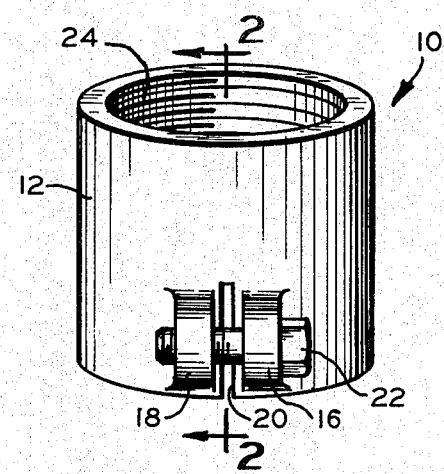
FIG. 1 is a perspective view of a pinch-bolt sleeve having internal threads formed thereon embodying the features of the present invention.
Figure 2:
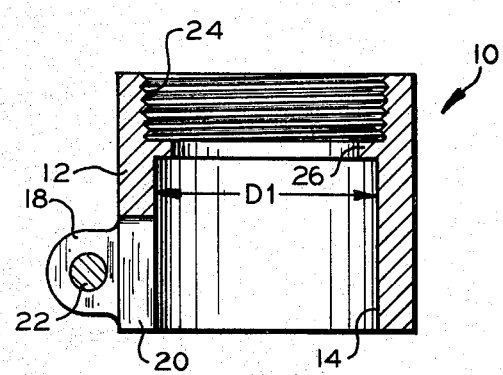
FIG. 2 is a sectional view taken along the line 2—2 of FIG. 1.

Referring to FIGS. 1 and 2, there is shown a threaded pinch-bolt sleeve 10 embodying the features of the present invention. The pinch-bolt sleeve 10 is utilized in conjunction with an associated retaining nut to hold a replacement shock absorber within the cylinder of a MacPherson strut suspension system.

The pinch-bolt sleeve 10 includes a generally cylindrical main body portion 12. The inner wall of the main body portion 12 has a lower annular portion 14 formed therein having a diameter D1, as indicated in FIG. 2. As will be discussed, the diameter D1 corresponds to the outer diameter of the cylinder over which the sleeve 10 is secured.

A pair of spaced apart bosses 16 and 18 extend in a generally radial direction from the outer wall of the main body portion 12. A vertical slot 20 is formed through the wall of the body portion 12 intermediate the bosses 16 and 18. A threaded bolt 22 extends through the boss 16 and into engagement with internally formed threads in the boss 18.

The inner wall of the main body portion 12 has an upper threaded portion 24 formed therein. An inwardly extending radial lip 26 is formed intermediate the upper threaded portion 24 and the lower annular portion 14.

Figure 3:
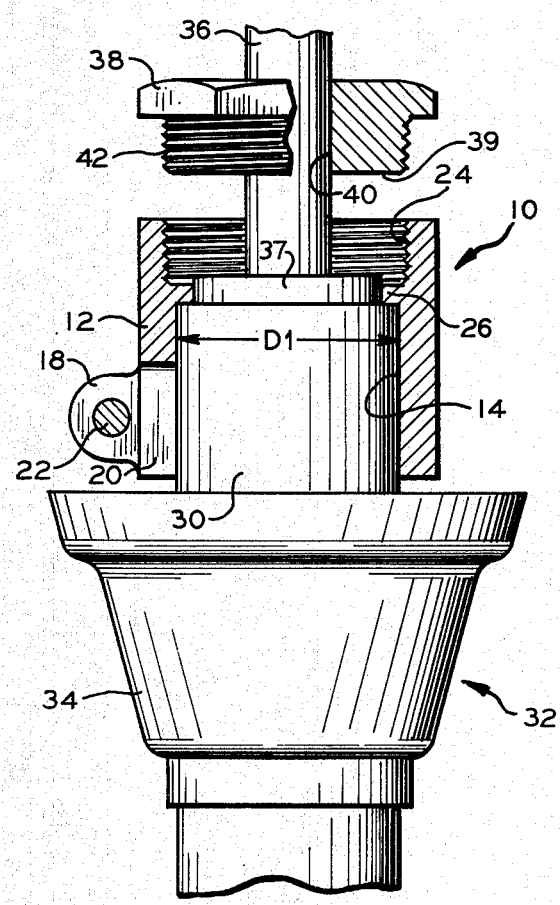
FIG. 3 is an elevational view similar to FIG. 2 with portions broken away showing the pinch-bolt sleeve secured to the upper end of a cylindrical housing of a MacPherson strut suspension system and in position to receive a retaining nut.

FIG. 3 illustrates the operation of the pinch-bolt sleeve 10 when it has been secured to a cylinder 30 of a MacPherson strut assembly, generally indicated by reference numeral 32. The MacPherson strut 32 shown in FIG. 3 has been partially disassembled by removing a coil spring (not shown) which was supported by a coil spring support 34 welded to the cylinder 30. A tool which can be utilized to remove the coil spring is disclosed in U.S. Pat. No. 4,034,960 to K. D. Kloster. A piston rod 36 of a replacement shock absorber 37 extends axially through an aperture formed in the top of the cylinder 30.

Before the replacement shock absorber can be placed within the cylinder 30, the original worn shock absorber must be removed therefrom. In instances where the original shock absorber has been sealed within the cylinder by welding or roll forming operations, the upper end of the cylinder must be severed to provide access to the original shock absorber. A tool which can be utilized to sever the upper end of the cylinder is disclosed in U.S. Patent Application Ser. No. 086,784 filed Oct. 22, 1979. After the upper end of the cylinder is severed, the worn shock absorber can be removed and replaced with a new shock absorber.

After the replacement shock absorber is inserted into the cylinder 30, the pinch-bolt sleeve 10 is placed on upper end of the cylinder 30 as shown in FIG. 3 such that the upper edge of the cylinder abuts against the radial lip 26 of the sleeve 10. The bolt 22 is then tightened to reduce the diameter of the lower portion of the sleeve 10 to secure the same to the cylinder 30. As previously mentioned, the outer diameter D1 of the cylinder 30 is substantially equal to the inner diameter of the lower annular portion 14 to ensure that the threaded portion 24 is properly aligned to receive a retaining nut 38 having a lower surface 39. The retaining nut 38 has a centrally located aperture 40 through which the piston rod 36 is inserted. The nut 38 also has threads 42 formed on the outer wall thereof for engagement with the threaded portion 24 of the sleeve 10. When the nut 38 is fully threaded onto the sleeve 10, the top edge of the replacement shock absorber 37 abuts the lower surface 39 of the nut 38.

Figure 4:
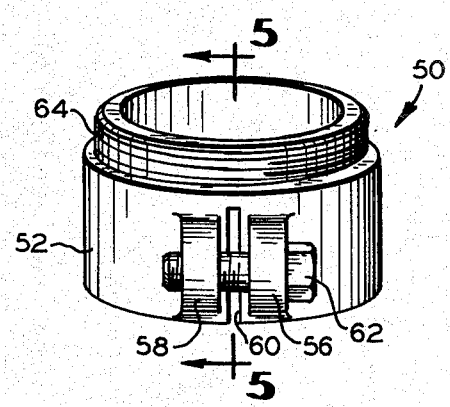
FIG. 4 is a perspective view of an alternative embodiment of the pinch-bolt sleeve illustrated in FIGS. 1, 2, and 3 having external threads formed thereon.
Figure 5:
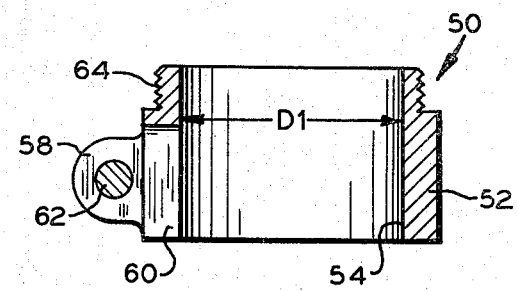
FIG. 5 is a sectional view taken along the line 5—5 of FIG. 4.
Figure 6:
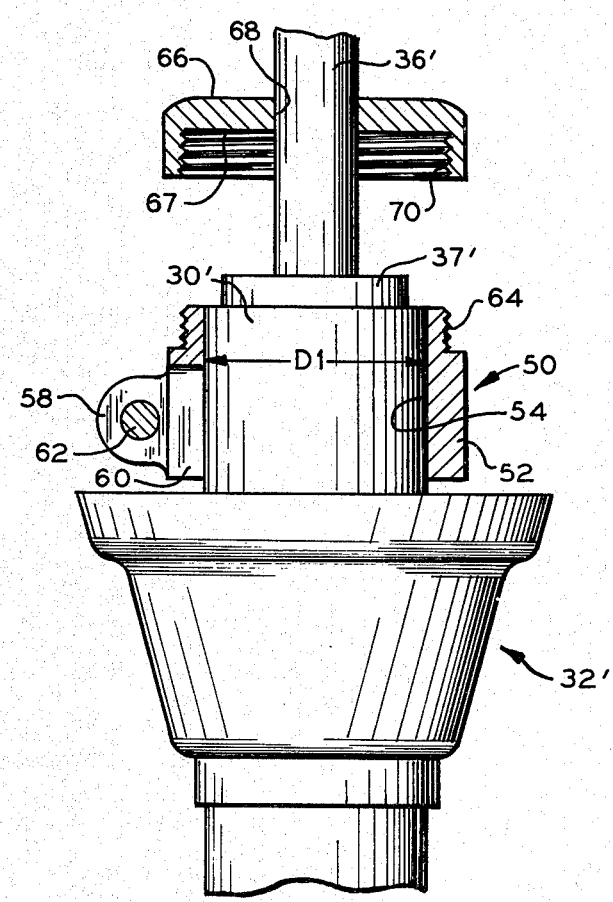
FIG. 6 is an elevational view similar to FIG. 5 with portions broken away showing the pinch-bolt sleeve illustrated therein secured to a cylindrical housing of a MacPherson strut assembly and in position to receive a retaining nut.

Referring to FIGS. 4 through 6, there is shown a pinchbolt sleeve 50 which is an alternative embodiment of the sleeve shown in FIGS. 1 through 3. The pinch-bolt sleeve 50 includes a generally cylindrical main body portion 52 having an inner annular wall 54 with a diameter D1, as indicated in FIG. 5.

A pair of spaced apart bosses 56 and 58 extend in a generally radial direction from the outer wall of the main body portion 52. A vertical slot 60 is formed through the wall of the body portion 52 intermediate the bosses 56 and 58. A threaded bolt 62 extends through the boss 56 and into engagement with inwardly formed threads in the boss 58. In this embodiment, an upper threaded portion 64 is formed on the outer wall of the main body portion 52.

FIG. 6 illustrates the operation of the pinch-bolt sleeve 50 when it has been secured to a cylinder 30' of a MacPherson strut assembly 32'. In this case, the sleeve 50 is placed over the cylinder 30' such that the upper end of the sleeve 50' is flush with the upper end of the cylinder 30'. The bolt 62 is then tightened to reduce the diameter of the lower portion of the sleeve 50 to secure the same to the cylinder 30'. The relatively close fit between inner annular wall 54 and the outer wall of the cylinder 30' ensure that the threaded portion 64 is properly aligned to receive a retaining nut 66 having a lower surface 67. The retaining nut 66 has a centrally located aperture 68 through which the piston rod 36' is inserted. The nut 66 also has threads 70 formed on the inner wall thereof for engagement with the threaded portion 64 of the sleeve 50. When the nut 66 is fully threaded onto the sleeve 50, the top edge of the replacement shock absorber 37' abuts the lower surface 67 of the nut 66.

It should be noted that, in some instance, it may be desirous to incorporate the pinch-bolt sleeve and the associated retaining nut into a single unit. In this type of pinch-bolt sleeve, a top wall (not shown) is attached to the main body portion and includes an aperture formed therein for receiving the piston rod of the shock absorber assembly. This type of construction would eliminate the need of having internal or external threads formed around the upper end of the main body portion.

In accordance with the provisions of the patent statutes, the principle and mode of operation of the invention have been explained in what is considered to represent its best embodiment. It should, however, be understood that the invention may be practiced otherwise than as specifically illustrated and described without departing from its spirit or scope in accordance with the attached claims.

What I claim is:

1. In combination with a cylinder means, a retaining means for retaining a shock absorber therein including a cylinder member having an outer wall and being open at one end, a shock absorber located within said cylinder member with a piston rod slidably extending through said open end, said retaining means including a device attached to said cylinder at said one end and engaging said shock absorber for retaining said shock absorber within the cylinder, said device including a hollow main body having an inner annular wall of a predetermined diameter positioned over said cylinder a top wall attached to one end of said main body and including an aperture receiving said piston rod clamp means for selectively varying the diameter of at least a portion of the inner annular wall of said hollow main body to provide tight frictional engagement with the outer wall of the cylinder, a first threaded section formed on the one end of said main body, and a second threaded section on said top wall for threaded engagement with said first threaded section on said main body.

2. The invention defined in claim 1 wherein said clamp means includes a slot formed to extend axially of said body from one end thereof toward the other, and threaded fastener means attached to said body adjacent said slot for selective adjustment to vary the diameter of said slotted end of said body.

3. The invention defined in claim 2 wherein said threaded fastener means includes a pair of radially extending bosses, one on each side of said slot, and an associated threaded shank member cooperating with said bosses to vary the spacing therebetween to correspondingly vary the diameter of one end of said body.

* * * * *

UNITED STATES PATENT AND TRADEMARK OFFICE
CERTIFICATE OF CORRECTION

PATENT NO. : 4,280,602

DATED : July 28, 1981

INVENTOR(S) : Kenneth D. Kloster

It is certified that error appears in the above-identified patent and that said Letters Patent are hereby corrected as shown below:

Title Page, under "Assignee", delete "Alvey, Inc., St. Louis, Mo."

Title Page, under "Attorney, Agent, or Firm" change "Gravely, Lieder & Woodruff" to -- Wilson, Fraser, Barker & Clemens --.

Signed and Sealed this

Fifteenth Day of December 1981

|SEAL|

Attest:

Attesting Officer

GERALD J. MOSSINGHOFF

Commissioner of Patents and Trademarks